United States Patent
Manepalli et al.

(10) Patent No.: US 10,070,347 B2
(45) Date of Patent: Sep. 4, 2018

(54) METHOD AND SYSTEM FOR IMPROVING CIRCUIT SWITCHED FALL BACK (CSFB) PERFORMANCE

(71) Applicant: Samsung Electronics Co., Ltd., Suwon-si, Gyeonggi-do (KR)

(72) Inventors: Venkateswara Rao Manepalli, Bangalore (IN); Subhasish Karmakar, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 258 days.

(21) Appl. No.: 14/770,707

(22) PCT Filed: Feb. 26, 2014

(86) PCT No.: PCT/KR2014/001556
§ 371 (c)(1),
(2) Date: Aug. 26, 2015

(87) PCT Pub. No.: WO2014/133313
PCT Pub. Date: Sep. 4, 2014

(65) Prior Publication Data
US 2016/0007239 A1    Jan. 7, 2016

(30) Foreign Application Priority Data

Feb. 26, 2013 (IN) .............................. 828/CHE/2013

(51) Int. Cl.
*H04W 36/00* (2009.01)
*H04W 76/27* (2018.01)
(Continued)

(52) U.S. Cl.
CPC ... *H04W 36/0022* (2013.01); *H04W 72/0453* (2013.01); *H04W 76/046* (2013.01); *H04W 76/27* (2018.02)

(58) Field of Classification Search
None
See application file for complete search history.

(56) References Cited

U.S. PATENT DOCUMENTS

| 8,705,445 B2 | 4/2014 | Watfa et al. |
| 2008/0039094 A1* | 2/2008 | Jeong .................... H04W 76/02 455/436 |

(Continued)

FOREIGN PATENT DOCUMENTS

| CN | 101594605 A | 12/2009 |
| CN | 101978767 A | 2/2011 |

(Continued)

*Primary Examiner* — Michael J Moore, Jr.
*Assistant Examiner* — Gautam Sharma
(74) *Attorney, Agent, or Firm* — Jefferson IP Law, LLP (57) ABSTRACT

A method and a system to improve circuit switched fall back (CSFB) performance specified in the $3^{rd}$ generation partnership project (3GPP) standard are provided. The system includes a user equipment (UE) to collect a neighbor frequency list from the network along with the redirection frequency transmitted by the long term evolution (LTE) network in response to extended service request (ESR) initiated by the UE. The UE selects the best frequency on which the UE can camp for CS call by applying additional offset criteria over the existing S-criteria during selection of serving frequency that effectively increases CSFB call success rate. The method enables the UE to override timer T300 and parameter N300 in the radio resource control (RRC) connection establishment process during a CSFB call procedure and effectively utilize the ESR time to attempt maximum possible RRC connection requests.

18 Claims, 4 Drawing Sheets

(51) Int. Cl.
*H04W 72/04* (2009.01)
*H04W 76/04* (2009.01)

(56) References Cited

U.S. PATENT DOCUMENTS

| | | | |
|---|---|---|---|
| 2009/0163217 A1* | 6/2009 | Xu | H04W 76/02 |
| | | | 455/450 |
| 2009/0227271 A1* | 9/2009 | Lee | H04W 4/02 |
| | | | 455/456.6 |
| 2010/0279648 A1 | 4/2010 | Song et al. | |
| 2010/0234026 A1 | 9/2010 | Tenny et al. | |
| 2010/0284333 A1 | 11/2010 | Shirota et al. | |
| 2010/0329244 A1 | 12/2010 | Buckley et al. | |
| 2010/0331011 A1 | 12/2010 | Vikberg et al. | |
| 2011/0021201 A1* | 1/2011 | Lee | H04W 48/20 |
| | | | 455/444 |
| 2011/0103277 A1 | 5/2011 | Watfa et al. | |
| 2012/0064884 A1 | 3/2012 | Ramachandran et al. | |
| 2012/0113982 A1 | 5/2012 | Akselin et al. | |
| 2012/0140644 A1 | 6/2012 | Ngai et al. | |
| 2012/0263039 A1* | 10/2012 | Ou | H04W 28/0205 |
| | | | 370/235 |
| 2013/0188473 A1* | 7/2013 | Dinan | H04W 56/0005 |
| | | | 370/216 |
| 2014/0036874 A1* | 2/2014 | Jeong | H04W 48/16 |
| | | | 370/332 |
| 2014/0128074 A1* | 5/2014 | Vangala | H04W 36/22 |
| | | | 455/436 |
| 2014/0341059 A1* | 11/2014 | Jang | H04W 48/06 |
| | | | 370/252 |
| 2016/0021581 A1* | 1/2016 | Deenoo | H04W 36/0055 |
| | | | 370/331 |

FOREIGN PATENT DOCUMENTS

| | | |
|---|---|---|
| CN | 102349328 A | 2/2012 |
| CN | 102415138 A | 4/2012 |
| EP | 2 343 918 A2 | 7/2011 |
| JP | 2012-532507 A | 12/2012 |
| KR | 10-2012-0020148 A | 3/2012 |
| KR | 10-2012-0103603 A | 9/2012 |
| WO | 2013/019288 A1 | 2/2013 |

* cited by examiner

METHOD AND SYSTEM FOR IMPROVING CIRCUIT SWITCHED FALL BACK (CSFB) PERFORMANCE

CROSS-REFERENCE TO RELATED APPLICATION(S)

This application is a U.S. National Stage application under 35 U.S.C. § 371 of an International application filed on Feb. 26, 2014 and assigned application number PCT/KR2014/001556, which claimed the benefit of an Indian patent application filed on Feb. 26, 2013 in the Indian Intellectual Property Office and assigned Serial number 828/CHE/2013, the entire disclosure of each of which is hereby incorporated by reference.

TECHNICAL FIELD

The present disclosure relates to the field of wireless communication. More particularly, the present disclosure relates to enhancement in circuit switched fall back (CSFB) procedure during inter-radio access technology (RAT) redirection.

BACKGROUND

The $3^{rd}$ generation partnership project (3GPP) long term evolution (LTE) is an evolving high speed, high capacity standard for user equipment (UE) emerging as a globally accepted standard. The LTE that is being deployed globally operates in packet switched (PS) domain. Currently, UEs equipped with LTE technology utilize LTE PS domain to handle data traffic while the voice traffic is handled by legacy circuit switched (CS) networks (legacy radio access technologies (RATs)), such as a global system for mobile communications (GSM), a universal mobile terrestrial system (UMTS) and a GSM enhanced data for global evolution (EDGE) radio access network (GERAN). To support CS domain communication, such as voice calls, the UE in LTE has to switch to CS supporting legacy RATs.

The circuit switched fall back (CSFB) procedure standardized by 3GPP technical specification enables the UE's to perform this switching during mobile originated (MO) or mobile terminated call (MT). The 3GPP standard defines inter-RAT (I-RAT) for mobility (switching) between LTE and earlier 3GPP technologies, such as UMTS and GERAN. To acquire a legacy RAT during I-RAT switching the 3GPP standard provides redirection based CSFB procedure.

In accordance with existing 3GPP standard for redirection based CSFB procedure, when the CS call is attempted while UE is in LTE, the UE starts an extended service request (ESR) procedure. When the extended service request is received by e-UMTS terrestrial RAN (UTRAN) Node B (eNB) of the LTE network, the eNB provides the UE with radio resource control (RRC) connection release along with redirection request including the target RAT frequency on to which the UE can camp for CS call. However, at many instances, redirection from LTE to other RATs like UMTS and GERAN fails due to redirected frequency being in poor signal conditions. The existing redirection based CSFB procedure fails to determine for and utilize other available frequencies which are comparatively better and on which the UE can camp to setup new RRC connection for MO call.

Moreover, in accordance with the existing redirection based CSFB procedure once the RRC connection is initiated, the UE camps to the serving frequency until the expiry of timer specified by T300*N300 even though the UE detects poor signal conditions. This timer in the existing CSFB procedure restricts the number of attempts to retransmit RRC connection request within the preset ESR timer. Thus, existing methods increase the CSFB call failure rate.

Therefore, a need exists for a method and a system to provide improved CSFB procedure to effectively reduce the CSFB call failure rate.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and a system that enable a user equipment (UE) to collect neighbor frequency list from the network along with the redirection frequency transmitted by the long term evolution (LTE) network.

Another aspect of the present disclosure is to provide a method to enable a UE to select the best frequency for camping among all available neighbor frequencies and the redirected frequency.

Another aspect of the present disclosure is to provide a method to override timers in a radio resource control (RRC) connection establishment process during a circuit switched fall back (CSFB) call procedure to effectively utilize an extended service request (ESR) timer for initiating maximum possible RRC connection requests.

In accordance with an aspect of the present disclosure, a method for improving a CSFB procedure in a UE during inter-radio access technologies (RATs) redirection in a $3^{rd}$ generation partnership project (3GPP) standard is provided. The method includes collecting at least one neighbor frequency and redirection frequency by the UE, overriding timers and counters of RRC connection establishment process, if a serving cell fails in at least one of serving cell criteria, random access channel (RACH), detecting a cell in at least one of serving frequency, the neighbor frequency, before ESR timer expires, and establishing the RRC connection with the cell, if the cell satisfies the serving cell criteria and the RACH before the ESR timer expires.

In accordance with another aspect of the present disclosure, a network for improving a CSFB procedure in a UE during inter-RAT redirection in a 3GPP standard is provided. The network is configured to transmit at least one redirection frequency to the UE during RRC connection release, and transmit at least one RAT to the UE.

In accordance with an aspect of the present disclosure, a UE for improving a CSFB procedure during inter-RAT redirection in a 3GPP standard is provided. The UE includes an integrated circuit, which includes at least one processor and at least one memory. Further the memory includes a computer program code within the circuit. The at least one memory and the computer program code with the at least one processor cause the UE to collect at least one neighbor frequency and redirection frequency. Further, the UE is configured to override timers and counters of RRC connection establishment process, if a serving cell in the redirected frequency fails in at least one of serving cell criteria, RACH. Further, the UE is configured to detect a cell in at least one of serving frequency, the neighbor frequency, before ESR timer expires. Finally, the UE is configured to establish the RRC connection with the cell, if the cell satisfies the serving cell criteria and the RACH before the ESR timer expires.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Various embodiments of the present disclosure describe a method and a system to improve the circuit switched fall back (CSFB) performance specified in the $3^{rd}$ generation partnership project (3GPP) standard. The method enables the user equipment (UE) to collect neighbor frequency list from the network along with the redirection frequency transmitted by the long term evolution (LTE) network in response to extended service request (ESR) initiated by the UE. The method enables the UE to select the best frequency on which the UE can camp for circuit switched (CS) call. The method enables the UE to apply additional offset criteria over the existing S-criteria during selection of frequency to camp on. The offset provided enables selecting the best frequency from the available frequencies for the UE to establish radio resource control (RRC) connection and effectively reduces CSFB call failure.

In an embodiment of the present disclosure, the method enables the UE to override T300 and N300 timers in the RRC connection establishment process during CSFB call procedure and effectively utilize the ESR timer. Thus, within the existing ESR timer the UE initiates maximum possible RRC connection requests providing the UE maximum attempts to establish successful RRC connection.

Thus, the present disclosure reduces the CSFB call failure rate and enhances user experience.

Referring now to the drawings, and more particularly to FIGS. 1 through 4, where similar reference characters denote corresponding features consistently throughout the figures, there are shown preferred various embodiments.

Figure 1:
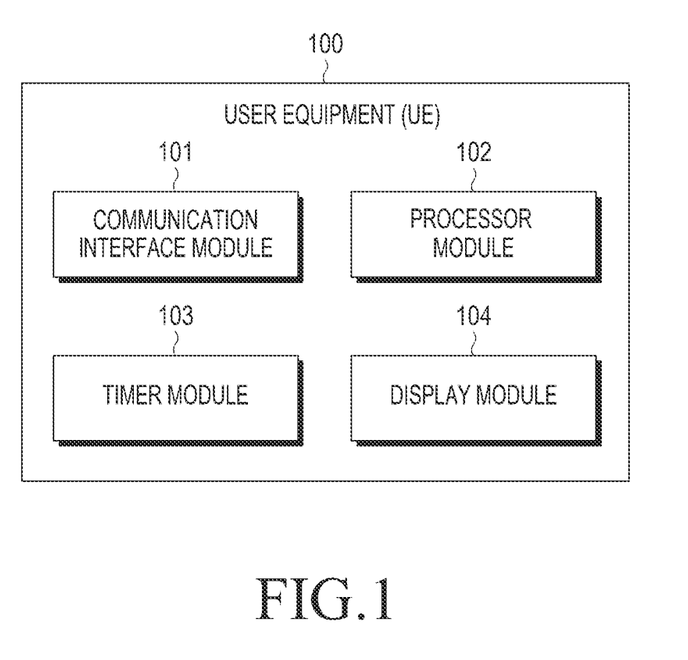
FIG. 1 illustrates a block diagram of a user equipment (UE) with various modules according to an embodiment of the present disclosure.

FIG. 1 illustrates a block diagram of a UE with various modules according to an embodiment of the present disclosure.

Referring to FIG. 1, a user equipment 100 comprises a communication interface module 101, a processor module 102, a display module 103 and a timer module 104. The communication interface module 101 enables the UE 100 to connect to the network. The network comprises of various communication technologies including but not limited to LTE, universal mobile terrestrial system (UMTS), global system for mobile communications (GSM), and GSM enhanced data for global evolution (EDGE) radio access network (GERAN). The processor module 102 executes set of instructions that are stored in a memory. For example, the processor executes instructions for selecting the serving frequency on which the UE 100 can camp on. The timer module 103 comprises various timers used by the UE 100. For example, the timer module comprises the timers T300 and N300 of the RRC connection establishment process. The display module 103 of the user equipment 100 comprises of a user interface, such as a display screen, providing data display and data input functions (For example, a touch key pad). In an embodiment of the present disclosure, the UE 100 may also comprise of several other modules which fall within the scope of the disclosure known to a person with ordinary skill in the art.

Figure 2:
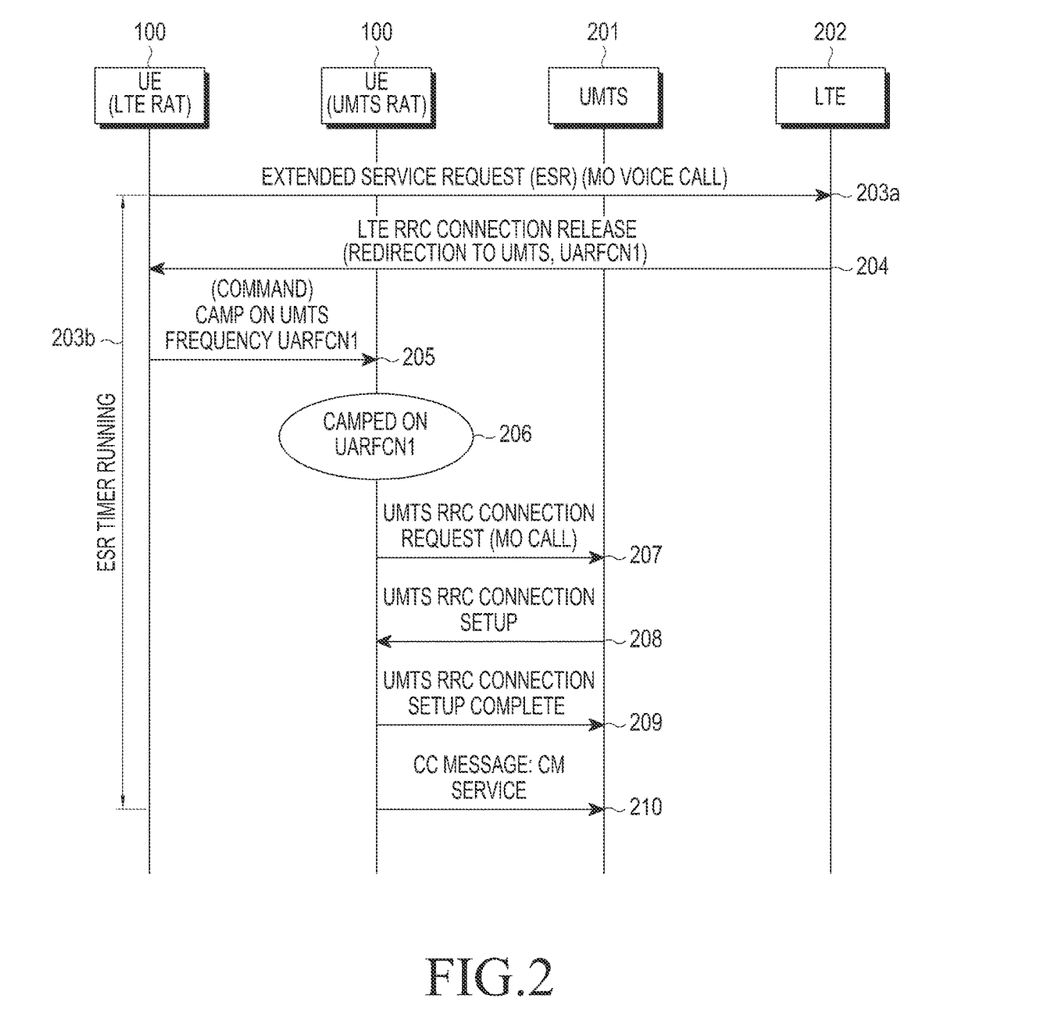
FIG. 2 illustrates a sequence diagram illustrating a redirection based circuit switched fall back (CSFB) call procedure in an existing $3^{rd}$ generation partnership project (3GPP) standard according to an embodiment of the present disclosure.

FIG. 2 illustrates a sequence diagram illustrating a redirection based CSFB call procedure in an existing 3GPP standard according to an embodiment of the present disclosure.

Referring to FIG. 2, a UE 100, communicating with networks UMTS 201 and LTE 202 during a CSFB call procedure in accordance with existing 3GPP standard is illustrated. The UE 100 currently in LTE 202 operating in packet switched (PS) domain initiates CS call and requires to fall back to legacy radio access technologies (RATs), such as UMTS 201 and GERAN for CS services. The CS call can be mobile originated (MO) or mobile terminated (MT) call.

At operation 203a, the UE 100 requests the current LTE with an ESR for the CS call (MO voice call).

At operation 203b, the UE 100 starts an ESR timer. In accordance with 3GPP standard the ESR timer is started and during the CSFB call procedure if the UE 100 is unable to establish the connection in UMTS/GSM RAT before ESR timer expires the CSFB call fails.

At operation 204, upon accepting the ESR the LTE 202 responds with an RRC connection release comprising the target RAT and redirection frequency UARFCN1. The target RAT is the legacy RATs to which the UE 100 has to switch for the desired CS call. The figure depicts UMTS 201 as target RAT. The redirection frequency (UARFCN1) is the frequency of the target RAT (UMTS 201) on which UE 100 has to camp on.

At operation 205, the UE 100 (LTE RAT) transmits a command to the UE 100 (UMTS RAT) camp on UMTS frequency UARFCN1.

In accordance with the existing CSFB call procedure the UE 100 receives maximum of one target RAT, one redirection frequency in the target RAT and some cells (cell identifiers) in the target RAT in the given redirected frequency.

Further, at operation 206, the UE 100 camps on a cell with the redirected frequency (UARFCN1). The cell on which the UE 100 camps on becomes the serving cell of the UE 100.

In UMTS standard procedure cell selection process allows the UE 100 to select a suitable cell to camp on and access available services. The UE 100 camps on a Cell when suitable criteria are satisfied. The cell selection S-criteria for the UMTS network (UMTS terrestrial RAN (UTRAN)) is fulfilled when:

For Frequency Division Duplex (FDD) cells:
Srxle>0 and Squal>0
For Time Division Duplex (TDD) cells:
Srxlev>0
Where:

$Squal = Q_{almeas} - (Q\text{qualmin} + Q\text{ualminOffset})$, and $Srxlev = Q_{rxlevmeas} - (Q\text{rxlevmin} + Q\text{rxlevminOffset}) - P\text{compensation}.$ At operation 207, the UE 100 then starts the standard RRC connection establishment procedure with RRC connection request to the UMTS 201 (target RAT). If the RRC connection request is successful, the UE 100 receives, in operation 208, UMTS RRC connection set up message.

At operation 209, the UE 100 responds with UMTS RRC connection set up complete message and establishes RRC connection with selected cell having the redirected frequency called serving cell with serving frequency as the redirected frequency. In operation 210, the UE 100 (UMTS RAT) transmits a common control message to the UMTS 201.

In accordance with UMTS standards, in case the UE 100 does not receive any response message for RRC connection request message, then the UE 100 retransmits the RRC connection request. Retransmission of RRC Connection Request is controlled by parameters like N300, variable V300 and timer T300. The UE 100 starts the timer T300 as soon as the RRC receives an indication from the medium access control (MAC) layer that a random access channel (RACH) for RRC connection request message is a success or a failure called a RACH success and a RACH failure, respectively. Upon expiration of T300 timer, if V300 is greater than or equal to N300, the UE 100 submits a new RRC connection request message to lower layers for transmission on the uplink common control channel (CCCH). The N300 timer defines a maximum number of RRC connection requests allowed and V300 is a counter for current number of RRC requests initiated. For every increment in counter V300, the timer T300 restarts when the MAC layer indicates a success or a failure to transmit the message. If V300 exceeds N300, the UE 100 fails to successfully establish the RRC connection within the defined time as set by the UMTS standard and enters idle mode.

Figure 3:
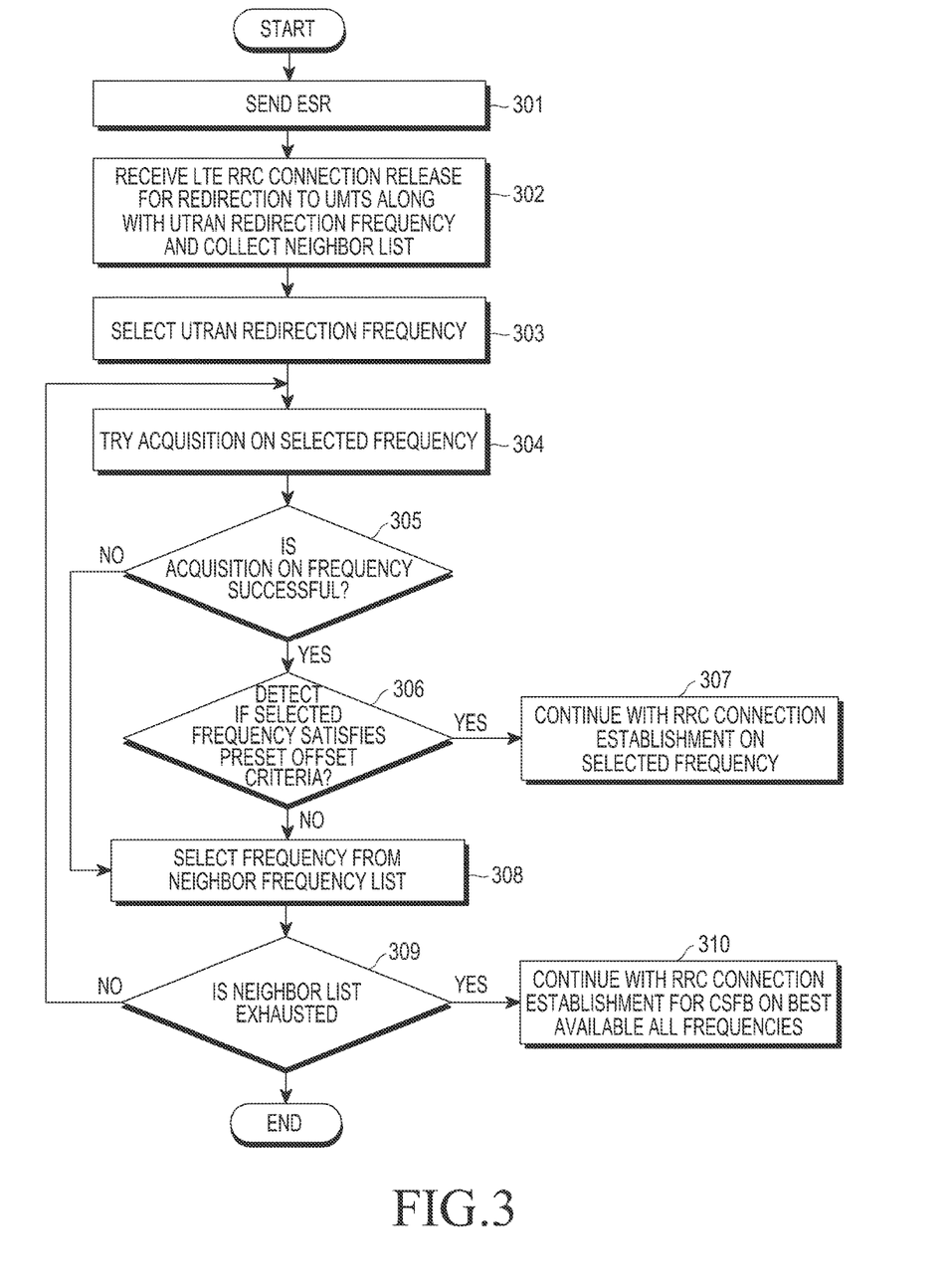
FIG. 3 illustrates a flowchart illustrating a process for selecting target radio access technologies (RAT) frequency to camp on during a CSFB call according to an embodiment of the present disclosure.

FIG. 3 illustrates a flowchart illustrating a process for selecting target RAT frequency to camp on during a CSFB call according to an embodiment of the present disclosure.

Referring to FIG. 3, at operation 301, the UE 100 in LTE 202 transmits the ESR to initiate the CS call. The LTE 202 upon accepting the ESR responds with an RRC connection release. At operation 302, the UE 100 receives the LTE RRC connection release that comprises target RAT (UMTS) and redirection frequency of the target RAT network.

In an embodiment of the present disclosure, the target RAT is GSM, UMTS or GERAN and the like.

At operation 302, the UE 100 also collects neighbor list from the network. The neighbor list comprises list of frequencies for the UE 100 to camp on and make connection to continue with the desired CS call.

In an embodiment of the present disclosure, the UE 100 collects the neighbor list from LTE SIB6, Idle Mode Mobility Control Information Element, GERAN system information, UMTS dedicated priority information and/or UMTS SIB11.

The method enables the UE 100 to select the best suitable frequency among all the available frequencies that include but are not limited to the redirection frequency and the neighbor list frequencies. The selection is based on signal conditions of the cells on the chosen frequency. During selection of cells in the frequency to camp on in the target RAT, the method enables the UE 100 to balance between the acceptable signal conditions for the call to be successful and honoring the network chosen redirection frequency as network would have chosen the frequency based on load conditions.

At operation 303, the UE 100 gives preference to the received redirection frequency from the LTE 202 and selects the UTRAN redirection frequency for the target UMTS. Further, at operation 304, the UE 100 attempts acquisition of cells on the selected frequency (currently the redirection frequency). A cell or cells providing communication on the selected frequency are analyzed to determine whether they provide acceptable signal conditions for CSFB call to go through. The UE 100 performs this determination based on the existing S-criteria. At operation 305, the UE 100 determines if the acquisition on the selected frequency is successful. If it is determined at operation 305 that the UE 100 is successful in acquiring the selected frequency on satisfying the S-criteria, at operation 306, the UE 100 performs an additional determination using the offset criteria. The offset criteria are in addition over the existing S-criteria. Thus, the method enables UE 100 to apply plurality of determines before camping on the selected frequency.

In an embodiment of the present disclosure, the additional offset criteria comprises performing offset (threshold) for Srxlev, and/or Squal parameters. CSFB_Offset_qual, CSFB_Offset_rxlev are the terms used for representing offset criteria (threshold). Though the offsets specified here are related to CSFB, similar offsets can be used by the UE 100 and/or given by the network for different scenarios like voice call, data call, and the like. This is not limited to UMTS RAT and can be given in any RAT.

An example of using this offset is provided below.

While ESR timer is running, consider the redirected UTRAN frequency for CSFB call, if the best cell in that frequency satisfies the criteria below; Srxlev>CSFB_Offset_rxlev; where CSFB_Offset_rxlev is a positive value, and/or Squal>CSFB_Offset_qual; where CSFB_Offset_qual is a positive value.

If offset criteria(s) are not met, search is conducted for the best cell in neighbor frequencies available from LTE SIB6, Idle Mode Mobility Control Information element, GERAN system information, UMTS dedicated priority information and/or UMTS SIB11.

If none of the cells in the frequencies satisfy offset(s), select the best cell among the available frequencies without applying the offset criteria.

An embodiment of the present disclosure enables the UE 100 to apply the additional offset over the existing S-criteria (used in UMTS cell selection for camping) when the redirection is for important procedures like CSFB. In an embodiment of the present disclosure, the offset can be internal to the UE 100 and/or given by the network.

If it is determined at operation 306 that the selected frequency satisfies the offset criteria, then at operation 307, the UE 100 continues with RRC connection establishment on selected frequency.

If it is determined at operation 305 that the UE 100 is unable to acquire the selected frequency as a result of a failure of S-criteria or if at operation 306 the selected frequency fails to meet the offset criteria, then at operation 308, the UE 100 selects a frequency from the neighbor list.

Further, at operation 309, the UE 100 repeats operations from operation 304 with the new selected frequency from the neighbor list. The UE 100 searches for all available frequencies in the neighbor list. If it is determined at operation 309 that the neighbor list is exhausted with none of the neighbor frequency having signal conditions to satisfy the frequency selection criteria, then at operation 310, the UE 100 still continues with RRC connection establishment for CSFB by selecting the best available frequency among all frequencies comprising the redirection frequency and frequencies from neighbor list.

In an embodiment of the present disclosure, the best frequency is the frequency having a cell that least deviates from the selection criteria.

Thus, the method enables the UE 100 to choose among the neighbor frequencies and the network redirected frequency rather than rely only on the redirection frequency. Further, the UE 100 is able to select the best among the available frequencies which improves CSFB call success rate and enhances user experience. The various operations of FIG. 3 may be performed in the order presented, in a different order or simultaneously. Further, in various embodiments of the present disclosure, some actions listed in FIG. 3 may be omitted.

In an embodiment of the present disclosure, the redirection request in LTE RRC Connection Release response carries more than one frequency of same target RAT.

In another embodiment of the present disclosure, the LTE RRC Connection Release response carries more than one RAT in redirection request.

The above embodiments enable enhancing the CSFB performance in weak signal conditions as the UE 100 may choose the best RAT out of the given RATs and/or the frequencies of the same RAT.

In an embodiment of the present disclosure, along with target RAT(s) and/or frequencies as part of RRC connection release procedure, the network provides a prioritized list for the target RATs and for the plurality of redirection frequencies transmitted to the UE 100. Using these priorities, the UE 100 can select the best available frequency at that instant of time.

Figure 4:
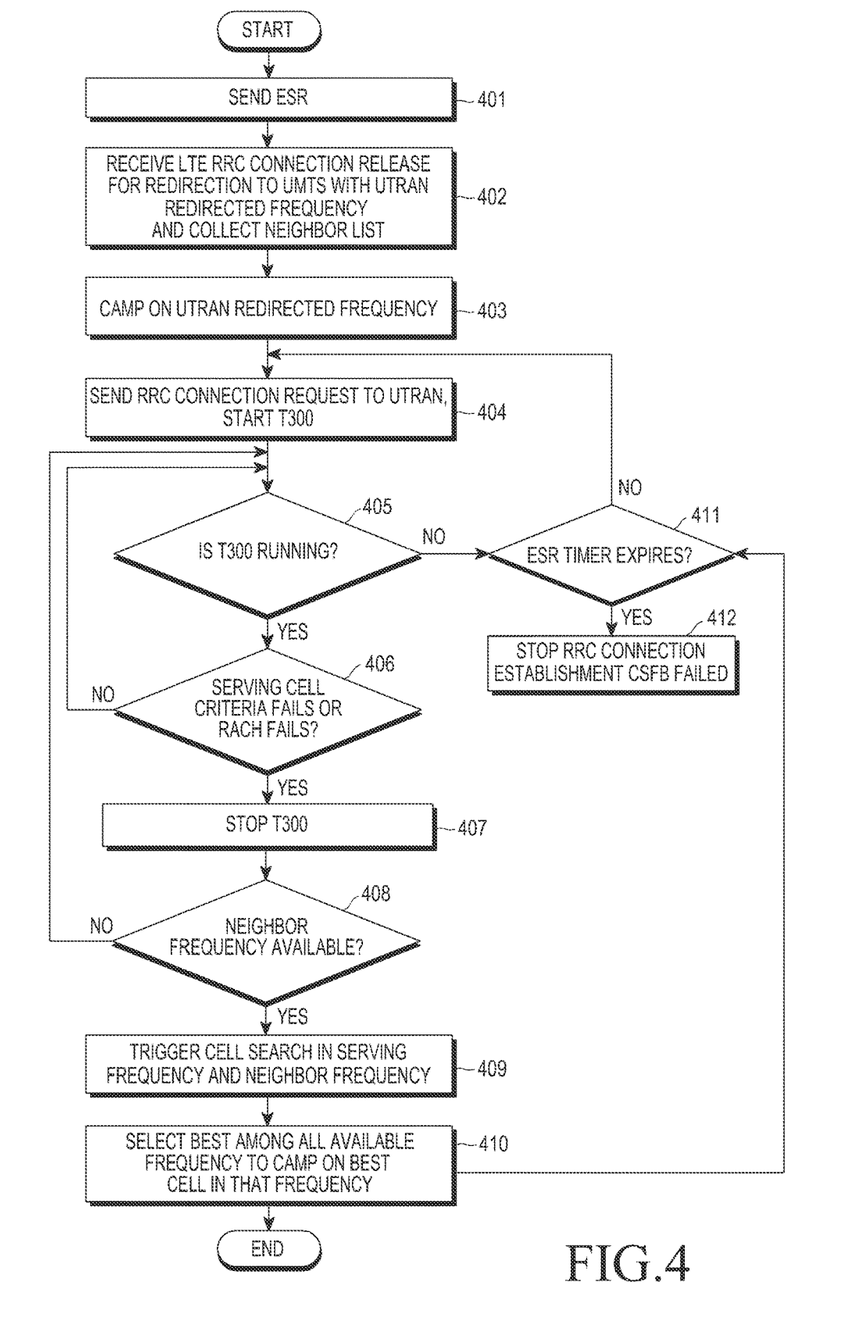
FIG. 4 illustrates a flowchart illustrating a process of handling timers/parameters in a radio resource control (RRC) connection establishment procedure in a target RAT according to an embodiment of the present disclosure.

FIG. 4 illustrates a flowchart illustrating a process of handling timers/parameters in an RRC connection establishment procedure in a target RAT according to an embodiment of the present disclosure.

Referring to FIG. 4, the method enables the UE 100 to override the timer T300 and parameter N300 in the existing RRC connection establishment process if the RRC connection establishment is for important procedures, such as a CSFB call, and the like. The active ESR timer indicates to the UE 100 about any ongoing CSFB procedure. The method enables the UE 100 to select a neighbor frequency during RRC connection establishment for CSFB if RRC connection establishment fails on the redirection frequency.

At operation 401, the UE 100 in LTE 202 transmits the ESR to initiate the CS call. The LTE 202, upon accepting the ESR, responds with an RRC connection release. At operation 402, the UE 100 receives the RRC connection release that comprises target RAT (UMTS) and redirection frequency of the target RAT network called UTRAN redirection frequency.

In an embodiment of the present disclosure, the target RAT is GSM, UMTS or GERAN, and the like.

At operation 402, the UE 100 also collects a neighbor list from the network. The neighbor list comprises a list of frequencies for the UE 100 to camp on and establish connection to continue with the desired CS call.

In an embodiment of the present disclosure, the UE 100 collects the neighbor list from LTE SIB6, Idle Mode Mobility Control Information element, GERAN system information, UMTS dedicated priority information and/or UMTS SIB11.

At operation 403, the UE 100 camps on the UTRAN redirected frequency. At operation 404, the UE 100 transmits RRC connection request to the UTRAN and starts (activates) the timer T300. At operation 405, the UE 100 determines if the timer T300 is active (running). If it is determined at operation 405 that the timer T300 is not running, the operation continues to operation 411 to determine if the ESR timer is still active (running). On the other hand, if it is determined at operation 405 that the timer T300 is running, then at operation 406, the UE 100 determines if serving cell satisfies the S-criteria or RACH failure occurs. The serving cell is the cell on to which the UE 100 is currently camped on and the frequency of the serving cell is the current serving frequency of the UE 100. If the S-criteria failure or the RACH failure is detected by the UE 100, then at operation 407, the UE 100 overrides (stops or deactivates) the timer T300.

In the existing standard of UMTS, timer T300 continues in spite of the UE 100 detecting RACH failure and only completion of the defined time set by timerT300 new RRC connection request is initiated. In the existing standard, the number of RRC connection request attempts for establishing RRC connection is limited by preset timer N300.

The method disclosed enables the UE 100 to override (neglect) N300 so as to allow the UE 100 to make maximum attempts before the ESR timer expires during important procedures, such as a CSFB call, and the like. By allowing the UE 100 to override (stop) T300 prematurely on detection of S-criteria failure or RACH failure, the UE 100 can quickly initiate a repeat RRC connection request. This provides the UE 100 more attempts for RRC connection request within the ESR timer limit and increases the success rate of RRC connection establishment.

After overriding (deactivating) timer T300, then at operation 408, the UE 100 determines if neighbor list frequencies are available. If it is determined at operation 408 that neighbor list is available, then at operation 409, the UE 100 triggers cell search in neighbor frequency and serving frequency. At operation 410, the UE 100 selects the best frequency among all available frequencies. At operation 411, the UE 100 determines if the ESR timer is still active (running). If it is determined at operation 411 that the ESR timer has not expired, the UE 100 utilizes ESR timer left over time to make RRC connection request attempt for the frequency selected at operation 410. Thereafter, the operation loops back to operation 404 for the RRC connection establishment with cell having the selected frequency. This process is repeated until all neighbor frequencies in the neighbor list are tried. On the other hand, if it is determined at operation 411 that the ESR timer is not active (not running), the UE 100, at operation 412, stops the RRC connection establishment.

If it is determined at operation 408 that no neighbor frequency is available, the operation loops back to operation 405 to re-attempt RRC connection request for the UTRAN redirected frequency if the ESR timer is active. The various operations illustrated in FIG. 4 may be performed in the order presented, in a different order or simultaneously. Further, in various embodiments of the present disclosure, some actions listed in FIG. 4 may be omitted.

The various embodiments disclosed herein can be implemented through at least one software program running on at least one hardware device and performing network management functions to control the elements. The elements shown in FIG. 1 include blocks which can be at least one of a hardware device, or a combination of hardware device and software module.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for a circuit switched fall back (CSFB) procedure in a user equipment (UE), the method comprising:
sending a radio resource control (RRC) connection request to a universal terrestrial radio access network (UTRAN) and starting a first timer of an RRC connection establishment process;
overriding the first timer, if a serving cell fails to satisfy at least one of serving cell criteria or a random access channel (RACH) failure occurs; and
detecting a cell for the CSFB in at least one of a serving frequency or at least one neighbor frequency, after overriding the first timer and before an extended service request (ESR) timer expires.

2. The method of claim 1, further comprising overriding the first timer to re-attempt multiple RRC connection requests before the ESR timer expires.

3. The method of claim 1, further comprising collecting the at least one neighbor frequency from a neighbor list, wherein the neighbor list comprises at least one of long term evolution (LTE) system information block6 (SIB6), an idle mode mobility control information element, a universal mobile terrestrial system (UMTS) SIB11, UMTS dedicated priority information, or global system for mobile communications (GSM) enhanced data for global evolution (EDGE) radio access network (GERAN) system information.

4. The method of claim 1, further comprising selecting the serving frequency to camp on before requesting for the RRC connection establishment from at least one of the at least one neighbor frequency or a redirection frequency.

5. The method of claim 1, further comprising:
receiving a redirection frequency; and
camping on the redirection frequency.

6. The method of claim 5, further comprising:
receiving multiple redirection frequencies from a long term evolution (LTE) network during an RRC connection release process.

7. The method of claim 1, further comprising selecting at least one radio access technology (RAT) among multiple RATs information transmitted by a long term evolution (LTE) network based on the signal condition.

8. The method of claim 1,
wherein the serving cell criteria comprises an offset criteria in addition to an S-criteria, and
wherein the offset criteria are applied on at least one of Srxlev, Squal parameters for a voice call, or a data call.

9. The method of claim 1, wherein overriding the first timer comprises:
checking if the first timer is active and the serving cell fails in the at least one of the serving cell criteria or the RACH; and
overriding the first timer if the first timer is active and the serving cell fails in the at least one of the serving cell criteria or the RACH.

10. The method of claim 1, wherein the first timer sets a time interval between RRC connection requests when a plurality of RRC connection requests are attempted.

11. A user equipment (UE) for a circuit switched fall back (CSFB) procedure, the UE comprising:
an integrated circuit comprising at least one processor; and
at least one memory having a computer program code within the circuit,
wherein the at least one memory and the computer program code with the at least one processor cause the UE to:
send a radio resource control (RRC) connection request to a universal terrestrial radio access network (UTRAN) and start a first timer of an RRC connection establishment process;
override the first timer, if a serving cell in a redirection frequency fails to satisfy at least one of serving cell criteria or a random access channel (RACH) failure occurs; and
detect a cell for the CSFB in at least one of a serving frequency or at least one neighbor frequency, after overriding the first timer and before an extended service request (ESR) timer expires.

12. The UE of claim 11, wherein the UE is configured to override the first timer to re-attempt multiple RRC connection requests before the ESR timer expires.

13. The UE of claim 11,
wherein the UE is configured to collect the at least one neighbor frequency from a neighbor list, and
wherein the neighbor list comprises at least one of long term evolution (LTE) a system information block6 (SIB6), an idle mode mobility control information element, a universal mobile terrestrial system (UMTS) SIB11, UMTS dedicated priority information, or global system for mobile communications (GSM) enhanced data for global evolution (EDGE) radio access network (GERAN) system information.

14. The UE of claim 11, wherein the UE is configured to select the serving frequency to camp on before requesting for the RRC connection establishment from at least one of the at least one neighbor frequency or the redirection frequency.

15. The UE of claim 11, wherein the UE is configured to:
receive the redirection frequency; and
camp on the redirection frequency.

16. The UE of claim 15, wherein the UE is configured to receive multiple redirection frequencies from a long term evolution (LTE) network during an RRC connection release process.

17. The UE of claim 11, wherein the UE is configured to select at least one radio access technology (RAT) among multiple RATs information transmitted by a long term evolution (LTE) network based on the signal condition.

18. The UE of claim 11,
wherein the serving cell criteria comprises an offset criteria in addition to an S-criteria, and
wherein the offset criteria are applied on at least one of Srxlev, Squal parameters for a voice call, or a data call.

* * * * *